Feb. 10, 1925.
C. W. STEVENS
1,526,301
METER SEAL
Filed Feb. 16, 1923
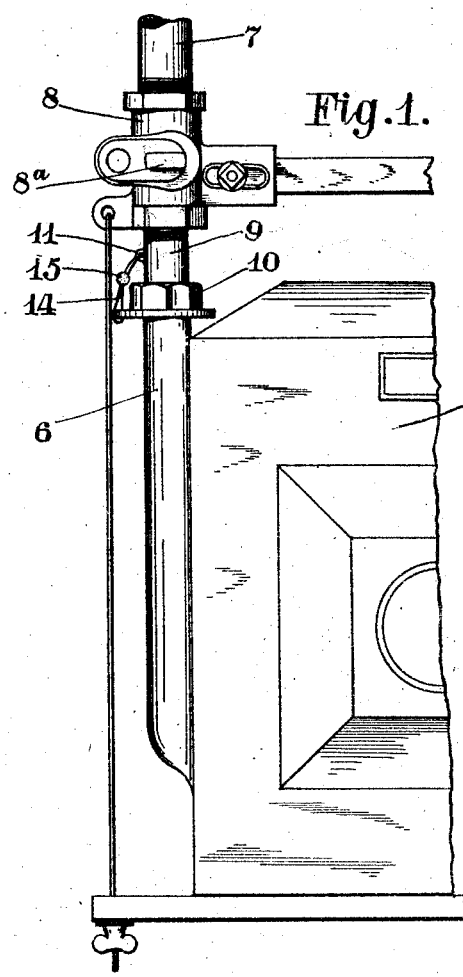
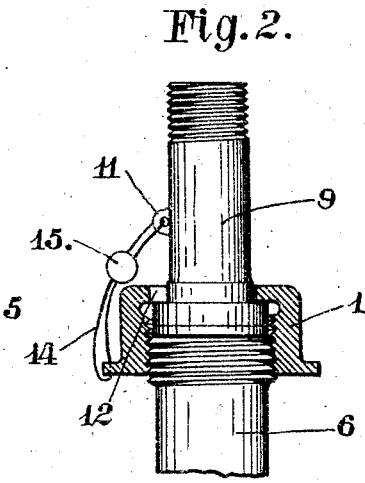
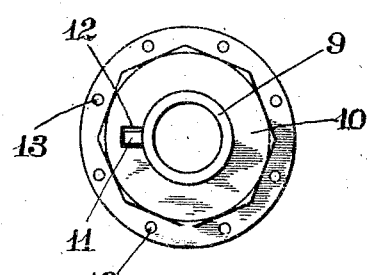
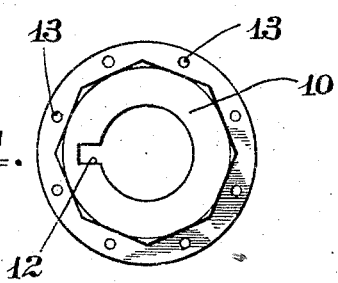
INVENTOR
CHARLES W. STEVENS
his ATTYS.

Patented Feb. 10, 1925.

1,526,301

UNITED STATES PATENT OFFICE.

CHARLES W. STEVENS, OF COLUMBUS, OHIO, ASSIGNOR TO THE LATTIMER-STEVENS COMPANY, OF COLUMBUS, OHIO, A CORPORATION OF OHIO.

METER SEAL.

Application filed February 16, 1923. Serial No. 619,379.

*To all whom it may concern:*

Be it known that I, CHARLES W. STEVENS, a citizen of the United States, residing at Columbus, in the county of Franklin and State of Ohio, have invented a certain new and useful Improvement in Meter Seals, of which the following is a specification.

The object of this invention is to provide an improved and simplified means for sealing meter connections for the purpose of deterring and detecting attempts to steal the supply. The present construction is designed more especially for use in connection with gas meters but the principle thereof can be used in connection with water or other liquid meters.

The invention is embodied in the example herein shown and described, the features of novelty being finally claimed.

In the accompanying drawing—

Figure 1 illustrates in elevation one side of a gas meter and hanger and connections therefor showing my invention applied thereto.

Fig. 2 is an elevation and sectional detail of the sealing means on a larger scale.

Fig. 3 is a top plan view of what is shown in Fig. 2.

Fig. 4 is a plan view of the union used in connection with the sealing means.

In the views 5 designates the meter which has the usual inlet pipe 6 permanently affixed thereto. The service or street pipe is designated 7. Such meters are usually hung to the service pipe 7 and the house pipe (not shown) by means of a hanger or connector pipe sections, that for the service side being shown at 8 said section containing a suitable valve 8ª for cutting off the supply within the house, if necessary or convenient. For connecting the meter with the hanger or connector pipe section 8 there is employed an externally threaded nipple 9 and an internally threaded union 10 adapted to turn on the nipple, the nipple being threaded into the hanger section 8 while the union is threaded onto the inlet pipe 6 of the meter. The nipple is enlarged at its lower end to press a packing washer against the end of the pipe 6. The threading of the nipple and union are of the same hand.

In the present instance the nipple 9 has cast therewith a lateral perforated ear 11 at a point somewhat above the normal position occupied by the union on the enlarged washer pressing end of the nipple and the union is made with a notch 12 in the rim of its upper opening adapted to permit the passing of the ear 11 when the union is dropped on the nipple preparatory to hanging the meter. The outwardly extending annular flange on the lower end of the union is provided with a series of small holes 13. After the nipple and union have been turned tightly into connecting position a short wire 14 is looped through both the perforated ear 11 and the nearest of the holes 13 and the ends of the wire secured in the usual manner in a lead seal 15 so that the wire can not be removed from its fastening without leaving evidence of the fact.

The nipple and union can not be turned together to effect a disconnection because their threads, although being of the same hand are male and female and require turning in opposite directions to connect or disconnect them. The turning off of one member is resisted by the other and necessitates the destruction of the seal.

The forms of the parts can be changed without departing from the gist of the invention as claimed.

What I claim is:

1. Meter sealing means including, in combination, a nipple, a union, the union and the nipple provided with threads of the same hand the nipple provided with a seal-wire receiving ear and the union with a series of cooperating seal-wire receiving perforations.

2. Meter sealing means including, in combination, a nipple, a union, the union and the nipple provided with threads of the same hand, the nipple provided with a seal-wire receiving ear on its side beyond the normal position of the union and the union with a series of cooperating seal-wire receiving perforations, said union provided with a notch in the margin of its central opening adapted to permit the passage of said ear when the parts are assembled.

3. Meter sealing means including, in combination, a nipple, a union, the union and the nipple provided with threads of the same hand, the nipple provided with a seal-wire receiving ear on its side beyond the normal position of the union thereon, and the union provided with a cooperating seal-wire receiving perforation, said union provided with a notch adapted to permit the passage of said ear when the nipple and union are to be assembled.

CHARLES W. STEVENS.